UNITED STATES PATENT OFFICE.

FELIX KAUFLER, OF BRÜCKL, AUSTRIA-HUNGARY.

METHOD OF PRODUCING AMYL ACETATE AND ITS HOMOLOGUES.

1,106,047.　　Specification of Letters Patent.　　Patented Aug. 4, 1914.

No Drawing.　　Application filed February 6, 1913. Serial No. 747,184.

*To all whom it may concern:*

Be it known that I, Dr. FELIX KAUFLER, subject of the Emperor of Austria-Hungary, residing at Brückl, Carinthia, Austria-Hungary, have invented certain new and useful Improvements in the Method of Producing Amyl Acetate and Its Homologues; and I do hereby declare the following to be a full, clear, and exact description of the invention, such as will enable others skilled in the art to which it appertains to make and use the same.

It is known (see Schorlemmer, *Liebig's Annalen* page 268) that the acetic acid ether of amylic alcohol is obtained by the decomposition of chlorpentane with fused acetate of potassium in presence of comparatively large quantities of acetic acid. In this process large quantities of amylene are formed, whereby the yield in amyl acetate is considerably diminished. This drawback also occurs when molten acetate of sodium is employed as usual.

Now applicant has found that by the employment of a sodium acetate of certain well defined physical properties the yield in amyl acetate may be considerably increased. For this purpose it is necessary that the sodium acetate be highly porous and bulky. Furthermore a small content of water is by no means prejudicial to its efficiency. The sodium acetate of this kind is prepared in the following manner: Approximately equivalent quantities of anhydrous sodium carbonate and glacial acetic acid or acetic acid of high percentage of concentration are mixed together. After the termination of the reaction a product is obtained which still contains much carbon dioxid and water. The product is now heated without however bringing it to melting temperature and during this operation the carbon dioxid and the greatest part of the water are expelled. During the heating the temperature is raised to 140° C.

The following is an example of the method of producing amyl acetate by means of the sodium acetate above referred to. A mixture of 100 parts by weight of chlorpentane, 72 parts by weight of porous bulky sodium acetate and 6 parts by weight of glacial acetic acid is heated under pressure for twelve hours to a temperature of from 195 to 210° C. The product of the reaction is either poured into water and the oily layer is separated, or it is directly submitted to distillation. The yield of pure amylacetate of a boiling point of from 120 to 146° C. amounts to about 65 parts by weight.

It has been further found that the efficiency of the sodium acetate thus prepared can be still increased by catalyzing agents, in particular by copper salts. The admixture of the catalyzing agent can be effected either after the acetate has been prepared, by the addition to the same of a copper salt, for instance of copper acetate, or the catalyzing agent can be added during the production of the sodium acetate, in which latter case copper carbonate can be added to the sodium carbonate and this mixture treated with acetic acid. In this manner the temperature and the duration of the reaction can be considerably reduced.

A mixture of 100 parts by weight of chlorpentane, 72 parts by weight of porous bulky sodium acetate, 3 parts by weight of copper acetate and 6 parts by weight of glacial acetic acid is heated under pressure for 8 hours to a temperature of from 170 to 180° C. The further treatment of the product and the yield are the same as in the case previously referred to.

In a similar manner and more or less with the same yield hexyl acetate can be produced from chlorhexane.

Claim:

1. The method of producing amyl acetate and its homologues, which comprises reacting with a porous bulky sodium acetate on a mono-chlorin derivative of a suitable hydrocarbon.

2. The method of producing amyl acetate and its homologues, which comprises first forming a porous, bulky alkaline metal acetate by saturating anhydrous alkali-metal carbonate with approximately the equivalent quantity of concentrated acetic acid and expelling the major portion of the water by heat below the melting point of the acetate, and reacting on this bulky, alkali-metal acetate with a mono-chlor-derivative of a suitable hydrocarbon.

3. The method of producing amyl acetate and its homologues, which comprises reacting with an alkali-metal acetate substantially free from water on a mono-chlor-derivative of a suitable hydrocarbon in the presence of a suitable salt capable of acting as a catalyzer.

4. The method of producing amyl acetate and its homologues, which comprises reacting with an alkali-metal acetate substantially free from water on a mono-chlor-derivative of a suitable hydrocarbon in the presence of a copper salt capable of acting as a catalyzer.

5. The method of producing amyl acetate and its homologues, which comprises first forming a bulky, porous alkali-metal acetate and a catalyzer by reacting on a dry mixture of alkali metal carbonate and copper carbonate with acetic acid sufficient to convert the carbonates into acetates, driving off the water by heating to a temperature below melting, and reacting with the bulky, porous product on a mono-chlor-derivative of a suitable hydrocarbon.

6. The method of producing amyl acetate and its homologues, which comprises reacting with an alkali-metal acetate substantially free from water on a mono-chlor-derivative of a suitable hydrocarbon in the presence of copper acetate.

In testimony that I claim the foregoing as my invention, I have signed my name in presence of two subscribing witnesses.

Dr. FELIX KAUFLER.

Witnesses:
 JOSEF RUBAROH,
 AUGUST FUGGER.